United States Patent [19]

Devine, Jr.

[11] Patent Number: 4,645,121

[45] Date of Patent: Feb. 24, 1987

[54] COMPOSITE ROTARY ANODE FOR X-RAY TUBE AND PROCESS FOR PREPARING THE COMPOSITE

[75] Inventor: Thomas M. Devine, Jr., Moraga, Calif.

[73] Assignee: General Electric Company, Schenectady, N.Y.

[21] Appl. No.: 702,165

[22] Filed: Feb. 15, 1985

[51] Int. Cl.[4] .............................................. B23K 20/16

[52] U.S. Cl. .................................... 228/194; 228/234; 228/263.12; 228/122

[58] Field of Search ................... 228/194, 263.12, 122, 228/123, 193, 234, 245

[56] References Cited

U.S. PATENT DOCUMENTS

| | | | |
|---|---|---|---|
| Re. 31,560 | 4/1984 | Devine, Jr. | 378/125 |
| Re. 31,568 | 4/1984 | Devine, Jr. | 378/125 |
| 3,122,424 | 2/1964 | King | 29/195 |
| 3,442,006 | 5/1969 | Gulchet et al. | 29/472.7 |
| 3,651,562 | 3/1972 | Hambleton | 228/123 |
| 3,660,053 | 5/1972 | Palme | 29/195 |
| 3,710,170 | 1/1973 | Friedel | 313/330 |
| 3,719,854 | 3/1973 | Sedlatschek et al. | 313/330 |
| 3,890,521 | 6/1975 | Shroff | 313/55 |
| 4,360,142 | 11/1982 | Carpenter et al. | 228/123 |

FOREIGN PATENT DOCUMENTS

| | | |
|---|---|---|
| 7112589 | 8/1972 | Fed. Rep. of Germany . |
| 1383557 | 2/1975 | United Kingdom . |

OTHER PUBLICATIONS

Storchheim, "Hot Pressure Bonding", Metal Progress, pp. 97–101, Jul. 1957.

*Primary Examiner*—Nicholas P. Godici
*Assistant Examiner*—Samuel M. Heinrich
*Attorney, Agent, or Firm*—Paul E. Rochford; James C. Davis, Jr.; Paul R. Webb, II

[57] ABSTRACT

A method for the diffusion bonding of a graphite member to a metallic surface of molybdenum, molybdenum alloy, tungsten or tungsten alloy as part of a composite rotary anode for an X-ray tube is set forth. In the completed structure a crack-free compound laminate separating and joining the graphite member and the metallic surface comprises a layer of carbide of metal of the metallic surface bonded to a layer of platinum or platinum alloy.

17 Claims, 3 Drawing Figures

COMPOSITE ROTARY ANODE FOR X-RAY TUBE AND PROCESS FOR PREPARING THE COMPOSITE

BACKGROUND OF THE INVENTION

This application relates to three other patent applications directed to diffusion bonding processes for the preparation of composite high performance rotary anodes for X-ray tubes. These applications, which are incorporated by reference, are U.S. patent application Ser. Nos. 702,164 —Devine, Jr., filed Feb. 15, 1985, Ser. No. 702,160 —Devine, Jr., filed Feb. 15, 1985 and Ser. No. 702,161 —Devine Jr., filed Feb. 15, 1985.

Workers in the field of designing rotary anodes for conventional X-ray imaging systems have long recognized the advantages of utilizing graphite in such construction. It soon became evident that in using graphite there also exists the danger that when a metallic surface of tungsten, tungsten alloys, molybdenum or molybdenum alloys is in direct contact with graphite, reactions between the metallic surface and the graphite (during manufacture of the rotary target and/or during use thereof to generate the X-ray beam) lead to the formation of a brittle intermediate carbide layer. The patent literature proposes various anode constructions as solutions to this problem, for example, U.S. Pat. Nos. 3,660,053; 3,719,854 and British Pat. Nos. 1,173,859; 1,207,648 and 1,247,244.

Another patent, U.S. Pat. No. 3,890,521 (U.S. '521), expresses concern with the formation of tungsten carbide by reaction between a graphite disc, or carrier, and the tungsten target layer while accepting the in situ formation of a carbide layer of tantalum (or presumably of hafnium, niobium or zirconium). Both this patent and U.S. Pat. No. 3,710,170 are concerned with thermal stresses introduced in the rotary anode structure because of the difference in thermal expansion coefficients between tantalum carbide (U.S. '521) and the adjoining structure and between graphite (U.S '170) and the adjoining structure. However, in the case of U.S. '170, as well as in U.S. '521, certain metal carbide content is deliberately employed as part of the solder material. For example, in U.S. '170 it is proposed that a molybdenum-molybdenum carbide eutectic be prepared by placing graphite in contact with molybdenum and heating to about 2200° C.

Still another concern is evident in British Pat. No. 1,383,557 wherein a solder layer of zirconium and/or titanium is employed to join graphite to molybdenum, tantalum or an alloy formed between two or more of tungsten, molybdenum, tantalum and rhenium. A carbide layer is formed between the graphite support and the solder layer. Particular temperature control and initial foil thickness are employed to insure survival of the solder layer.

The great variance in thought in the preceding prior art as to how to best join graphite to refractory metals, particularly tungsten, tungsten alloys, molybdenum and molybdenum alloys, shows how complex this problem has remained in the design of rotary anodes for conventional X-ray apparatus.

These varied solutions, to the extent they may be viable in conventional X-ray imaging systems, face a much more severe test in connection with the use of graphite members in X-ray tubes used in medical computerized axial tomography (C.A.T.) scanners. In the formation of images, a medical C.A.T. scanner typically requires an X-ray beam of from 2 to 8 seconds in duration. Such exposure times are much longer than the fractions-of-a-second exposure times typical for conventional X-ray imaging systems. As a result of these increased exposure times, much larger quantities of heat (produced as a by-product of the process of X-ray generation in the target region) must be stored and eventually dissipated by the rotating anode.

Graphite, which provides a low mass, high heat storage volume, remains a prime candidate, of course, for inclusion in rotating anode structures for C.A.T. scanner X-ray tubes, particularly when the graphite member functions as a heat sink from which heat is dissipated as radiant energy as is disclosed in U.S. Pat. No. 3,710,170 and U.S. Pat. No. Re. 31,568, rather than as support for the target anode layer.

One important consideration in the manufacture of a composite anode disc embodying a graphite member is the method by which the graphite is bonded to an adjacent tungsten, tungsten alloy, molybdenum or molybdenum alloy metallic surface. In spite of the favorable view taken of the presence of carbides of tantalum, hafnium, niobium, zirconium and of the eutectic of molybdenum carbide and molybdenum in U.S. '170 and/or U.S. '521, workers in the art view with alarm the formation of any layer of tungsten carbide or molybdenum carbide between the graphite member and an adjacent tungsten, tungsten alloy, molybdenum or molybdenum alloy surface to which the graphite must remain bonded. Formation of such a carbide layer is of particular concern, because of the propensity thereof for cracking. Cracking results in a reduction in heat flow from the metal surface to the adjacent graphite member and frequently will compromise the structural integrity of the anode.

In X-ray tubes used in C.A.T. scanners, the bulk temperatures of such anodes reach temperatures of 1200°-1300° C. in operation. At such temperatures, tungsten, tungsten alloys, molybdenum or molybdenum alloys readily form the undesired metal carbide. Thus, it has been considered particularly important for such rotary anodes to devise a joining procedure and anode structure in which the metallic surface is not permitted to react with the graphite and, even more important, that provision is made in the composite anode structure to prevent reaction from occurring between the metallic surface and the graphite during operation of the C.A.T. scanner X-ray tube.

Three reissue patents (U.S. Pat. Nos. Re. 31,369; Re. 31,560 and Re. 31,568) issued to Thomas M. Devine, Jr., describe a brazing procedure in which a layer of platinum, palladium, rhodium, osmium, ruthenium or platinum-chromium alloy is interposed between the metallic surface and the graphite body to which it is to be joined. Although a brazed region develops above and below the interposed layer, this layer itself survives to function as a barrier to carbon diffusion during operation of the X-ray tube. The aforementioned braze materials are characterized by their ability to react with tungsten, tungsten alloys, molybdenum, molybdenum alloys and also with graphite Because the reaction of the interposed layer with graphite can only proceed at a temperatures in excess of the temperatures that are reached by the rotating anode in service, even at the maximum service temperature an intermediate platinum layer, for example, will act as a diffusion barrier for carbon to prevent the passage thereof through the platinum, where it would be able to form the brittle tungsten or molybdenum carbide.

The use of alloys of platinum as an intermediate layer to join graphite to tungsten or tungsten alloy is disclosed in Gebrauchmuster No. 7,112,589 and the use of alloys containing platinum as an intermediate layer to join graphite to tungsten or molybdenum is disclosed in U.S. Pat. No. 3,442,006 (U.S. '006). In both of these inventions the process for joining requires that the intermediate layer be melted. An intermediate layer of any of the alloys proposed in U.S. '006 would fail as a diffusion barrier to carbon at X-ray anode operating temperatures.

In the practice of the inventions in the Devine patents the formation of the objectionable carbide is avoided provided that the brazing is accomplished quickly. At the brazing temperatures employed, which render the intermediate layer (e.g., platinum) molten, the intermediate molten layer can become saturated with carbon. By way of example, liquid platinum can, over a period of time at a temperature just above the eutectic temperature, dissolve up to about 16 atomic percent carbon. When tungsten or molybdenum is in contact with such a high carbon content liquid, carbide will form at the interface. The amount of time available for the carbon to dissolve in the liquefied braze layer is, therefore, important and if the assembly being brazed remains at a high temperature for too long a period of time, a thick layer of carbide can form, which layer is in danger of becoming cracked during cooling or handling. In the case of the use of platinum as the braze layer to affix molybdenum to graphite, a temperature exposure of about 1800° C. for as little as about 5 minutes will result in a layer of molybdenum carbide about 0.003 inch in thickness.

Therefore, in the practice of the process disclosed in the Devine reissue patents, if brazing capability is available at the manufacturing facility to provide fast ramping to brazing temperature, holding for a short time and then cooling to below 1400° C. in a brief time frame, carbide formatio.n is avoided. However, such ideal heating arrangements, which are commercially available, may not be accessible and it may be necessary to use a larger furnace. A problem that will occur when a number of rotary anode discs (typically 4 or 5 inches in diameter) are processed simultaneously in a furnace of high thermal mass is that each such disc tends to stay hot for a relatively long period of time and thick, cracked layers of carbide can form. Consequently, as an alternative to the aforementioned brazing method, it would be desirable to have a joining technique and anode composition, which can tolerate having the anode discs spend a finite length of time (e.g., minutes) at the joining temperature (and thereby permit the use of furnaces of high thermal mass) and the rotary anodes produced from such composites will be able to render high quality performance in the rigorous environment of the C.A.T. scanner X-ray tube.

DESCRIPTION OF THE INVENTION

One essential aspect of this invention has been the discovery that, whereas workers in the art have consistently sought to totally avoid the formation of tungsten carbide or molybdenum carbide layers in the joint bonding a graphite body to a surface of tungsten, tungsten alloy, molybdenum or molybdenum alloy in a rotary anode, what is important is not the presence or absence of such carbide layers, but the thickness thereof (and the assurance that such carbide layers will not increase in thickness during use of the composite).

By the use of diffusion bonding employing the temperatures, times and applied stresses defined herein, assemblies of molybdenum (or molybdenum alloys)-platinum-graphite or tungsten (or tungsten alloys)-platinum-graphite are converted to sound diffusion-bonded composites (useful in rotary anodes) in which a surviving continuous layer of platinum functions as an effective barrier to the transport of carbon at anode operating temperatures. The composite produced includes in the joint a crack-free layer of carbide of molybdenum or tungsten metallurgically bonded to the platinum layer, the carbide layer being less than about 0.0002 inch thick. A molybdenum carbide or tungsten carbide layer of such thickness does not introduce defects such as would be the case with a carbide layer having a thickness of about 0.0007 inch or greater. It is the control afforded by the process of this invention that for the first time makes feasible the acceptability of the presence of a layer of tungsten carbide or molybdenum carbide in a high performance rotary anode, because it is kept so thin.

Diffusion bonding conducted in an atmosphere inert to the assembled elements for about 4–5 minutes at temperatures ranging from about 1450° C. to 1550° C. (i.e., no melting of the platinum) with stress applied generally normal to the joining interfaces produces the above-described crack-free carbide layer and an overall sound composite structure. The applied stress should be of a magnitude at least sufficient to bring, and maintain, adjacent elements in intimate enough contact to enable atoms to diffuse across the interface. The requisite applied stress to achieve good bonding depends on the finishes of the mating surfaces of the members. The lower the stress employed, the smoother the mating surfaces should be. At an applied stress of 2000 psi, sound joints can be produced using the aforementioned times and temperatures without any need for special surface preparation. Also, in general, when using a platinum foil, the applied stress must be higher than when the platinum is electroplated as a layer over the graphite surface and within the graphite pores.

BRIEF DESCRIPTION OF THE DRAWING

The features of this invention believed to be novel and unobvious over the prior art are set forth with particularity in the appended claims. The invention itself, however, as to the organization, method of operation and objects and advantages thereof, may best be understood by reference to the following description taken in conjunction with the accompanying schematic drawings wherein:

MANNER AND PROCESS OF MAKING AND USING THE INVENTION

Figure 1:
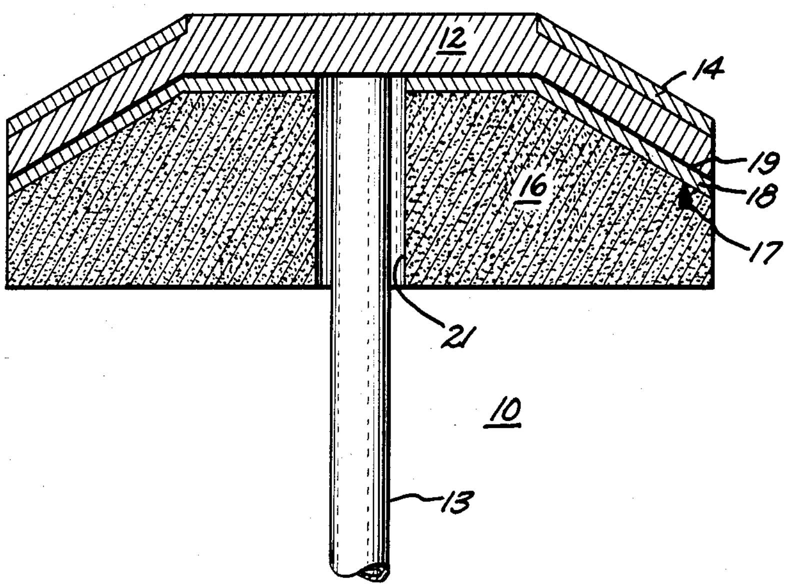
FIG. 1 is a view predominately in cross-section of a composite rotary anode construction prepared in accordance with the process described herein.

Referring now to FIG. 1, there is shown a composite rotary anode 10 prepared by the method of this invention in which disc (also referred to as a support, or carrier) 12, preferably made of molybdenum or molybdenum alloy, is joined to stem 13 by brazing, welding and the like. Disc 12, which supports anode target 14 affixed to a selected surface area of the outer surface thereof, is diffusion bonded to graphite member 16 via the compound laminate 17 present in the completed structure. The compound laminate 17 comprises continuous platinum layer 18 (with some carbon dissolved therein) and carbide layer 19. These layers 18 and 19 are metallurgically bonded to each other and to the adjoining surfaces. It can be inferred that an ultrathin zone (not shown) of interdiffused platinum and molybdenum with some carbon dissolved therein exists between layers 18 and 19 although not visible in the scanning electron microscope.

Carbide layer 19, which is produced during the manufacturing process is of a tolerable thickness (less than about 0.0002 inch) and is crack-free. Because of the presence of platinum layer 18 as a barrier to carbon diffusion, carbide layer 19 does not grow in thickness during operation of the X-ray tube even under the conditions of operation of a medical C.A.T. scanner. In the case in which disc 12 is made of molybdenum or a molybdenum alloy, carbide layer 19 will be a layer of molybdenum carbide ($Mo_2C$).

As will be further supported hereinbelow, the processing conditions, which make it possible to controllably limit the thickness of the carbide layer are essential aspects of this invention. Thus, the relationships of temperature, time and applied stress are essential, while such aspects as part surface finish, thickness of the platinum layer, cleanliness and freedom from initial stress enable optimization of the diffusion bond and, thereby, the soundness of the joint between the graphite member and the metal surface.

Graphite member 16 is provided with an aperture (the wall of which is designated by the numeral 21) enabling stem 13 to be bonded directly to metal disc 12. Sufficient space is maintained between the surface of stem 13 and wall 21 of the graphite member to obviate the formation of carbides in the metal of stem 13.

Preferably the platinum used in the practice of this invention will have a purity of at least about 99.5%, this purity being commercially available. Such grades of platinum are soft and extremely ductile. Platinum alloys (i.e., platinum is the major constituent by weight) in which the alloying addition does not destroy the ability of the layer to function as a barrier to carbon transit during operation of the anode (e.g., platinum with 1% by weight chromium) may also be used. In addition, the alloying additive should not result in a carbide layer greater than about 0.0002" in thickness using the process limitations of this invention. The ability of a given platinum alloy to meet these criteria can be routinely determined.

The material of anode target 14 typically comprises tungsten, an alloy of tungsten and rhenium, and the like. When the material of anode target 14 is an alloy of tungsten and rhenium, the rhenium content typically varies from 3 to 10 weight percent but may be as high as 25 weight percent.

Graphite member 16 contributes the favorable features of high heat storage and high heat dissipating capability. As shown, disc 12 is saucer-like in configuration and the matching surface of the heat sink, graphite member 16, is similarly contoured.

A powdered metallurgical technique may be employed to form disc 12 and anode target 14 as a unit. In such case, a predetermined amount of the powder metal material provided to constitute the anode target 14 is placed in a die. The molybdenum (or molybdenum alloy, tungsten or tungsten alloy) powder to constitute disc 12 is then added to the die and the powder metals are compressed to form a unified green compact. The green compact is then sintered and hot forged to produce the disc/target combined structure. It is at this point in the manufacturing process that graphite member 16 is diffusion bonded to the underside of support disc 12 as described herein. Thereafter, stem 13 is joined to disc 12 by inertia welding, brazing, diffusion bonding and the like. The stem material is preferably columbium or a columbium alloy. Preferably stem 13 is hollow to reduce heat conduction along its length.

Figure 2:
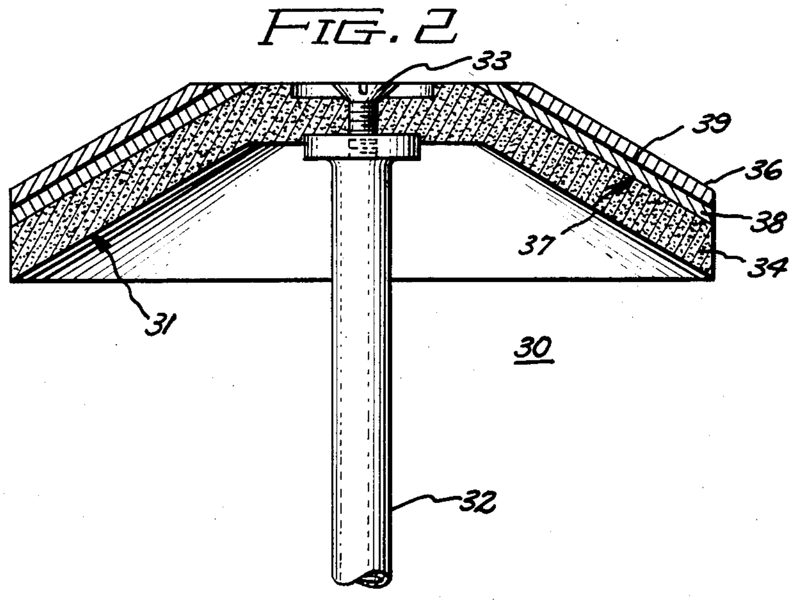
FIG. 2 is a view in cross-section in large part of another embodiment of a composite rotary anode construction prepared according to the process of this invention and FIG. 3 is a flow diagram defining essential steps employed in the preferred mode for preparing the composite rotary anode constructions of this invention.

A second configuration of a composite rotary anode employing a graphite member is shown in FIG. 2. The completed composite rotating anode 30 includes a disc assembly 31 joined to stem 32 by means of screw assembly 33. Disc assembly 31 comprises the saucer-like configured graphite disc 34 and preformed annular shaped anode target 36 diffusion bonded thereto via the compound laminate 37. Compound laminate 37 comprises continuous layer 38 of platinum metal and thin metal carbide layer 39 metallurgically bonded thereto and to adjoining members as in FIG. 1. As in FIG. 1 a zone (not shown) of interdiffused platinum and molybdenum with some carbon dissolved therein can be inferred to be present between layers 38 and 39. Carbide layer 39, typically tungsten carbide, is formed by the reaction of the metal of target 36 with carbon. As in the case of carbide layer 19, layer 39 is produced during the diffusion bonding step, has a thickness less than about 0.0002 inch and is crack-free.

The platinum or platinum alloy layer may be provided in the form of a foil, preferably about 0.002 inch thick, by electroplating or vapor depositing (e.g., sputtering) the platinum on the graphite. Further, platinum foil may be used in combination with a platinum layer provided by either of the other deposition processes. When such multiple layers of platinum are employed, they become metallurgically bonded together during the diffusion bonding step but are distinguishable as layers because of differences in microstructure.

The target anode 36 of tungsten or tungsten-rhenium alloy is joined to the graphite substrate 34 by positioning target 36 over graphite member 34 with the platinum layer disposed therebetween. These component elements are urged into close abutting contact by the application of stress thereto during the subsequent diffusion bonding, which is preferably conducted in vacuum. Other inert atmospheres, such as hydrogen or argon can be used.

Figure 3:
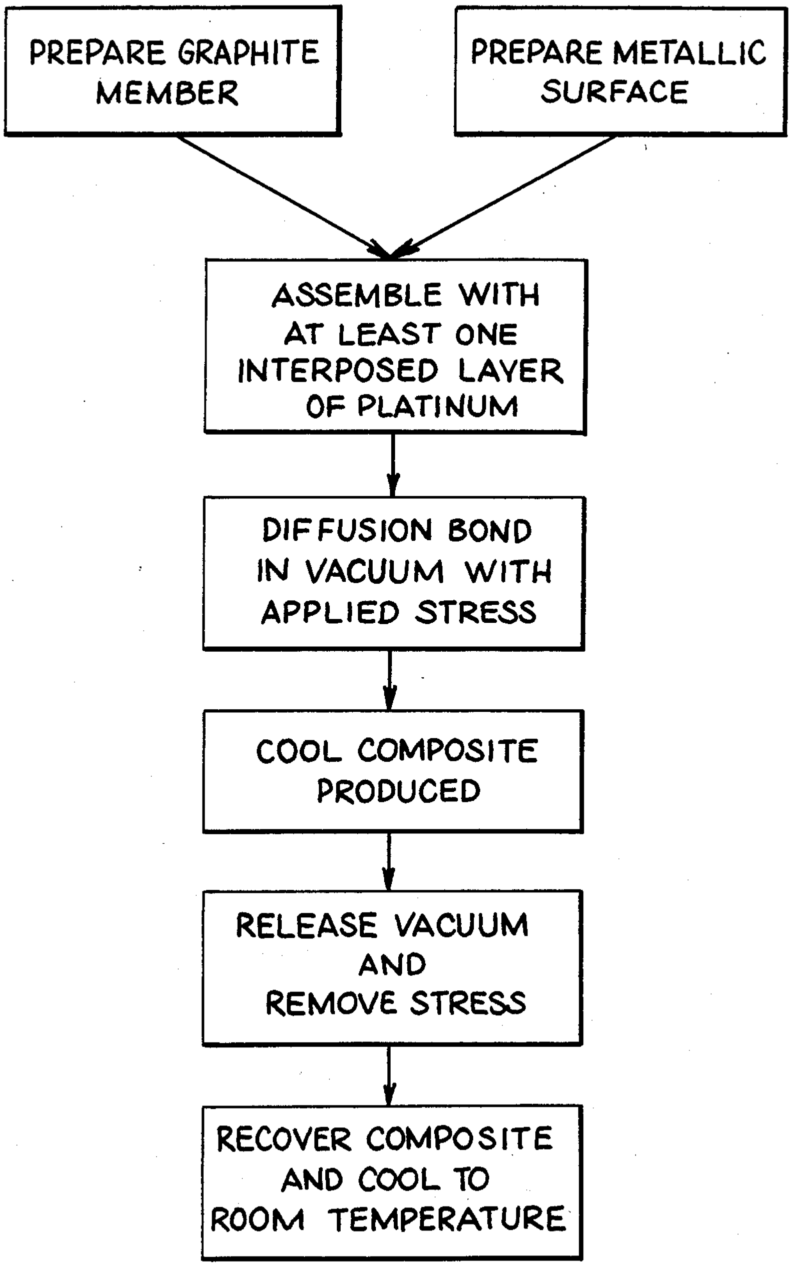

The process of joining the graphite member to a metallic surface [either the metal disc 12 (FIG. 1 embodiment) or the metal target layer 36 (FIG. 2 embodiment)] is briefly outlined in the flow diagram of FIG. 3.

Various preparatory steps may be taken in the preparation of (a) the graphite member, (b) the metallic surface and (c) the layer of platinum or platinum alloy. Thus, in the case of the graphite, in addition to the forming thereof in the desired shape, the graphite body may be subjected to ultrasonic cleaning and/or thermal shock. In the case of the metallic surface of tungsten, tungsten alloy, molybdenum or molybdenum alloy, the component presenting this metallic surface may be subjected to stress relief anneal, etching and/or ultra-sonic cleaning in an organic solvent. The exposed surface of electroplated or vapor deposited platinum may require improved surface finish to insure adequate contact with the metallic surface. Such improved contact may be obtained by grinding and polishing or by lap finishing the surface(s).

After the graphite member and metallic surface have been prepared for assembly they are disposed in a "sandwich" arrangement with at least one layer of platinum (e.g., a platinum disc, an electroplated layer of platinum or a combination of electroplated platinum with a platinum disc) therebetween. The assembled components are placed in a heating chamber in which a vacuum can be drawn. Stress is applied to the assembly to urge the components of the assembly into intimate contact, the extent of applied stress depending upon the surface finishes of the mating parts. The vacuum is now drawn. The assembled components, while under the applied stress, are heated, preferably by radiation, in the vacuum environment to the desired temperature for the preselected period of time. This constitutes the diffusion bonding process. After completion of the diffusion bonding step, the heating is stopped and the sample is permitted to cool. When the temperature of the unified composite reaches approximately 300° C., air can be admitted to the chamber, the stress on the diffusion-bonded composite is reduced to zero and the composite is removed and permitted to cool to room temperature (i.e., about 68°–72° F.).

Table I displays the results of diffusion bonding tests conducted on molybdenum-platinum-carbon assemblies to produce diffusion-bonded composites employing the platinum in the form of a foil. Table II sets forth the results of similar diffusion bonding tests wherein the platinum was electroplated on the carbon (i.e., the graphite member). In four of the tests (O-R) reported in Table I a combination of 0.002 inch platinum foil was used in combination with an electroplated layer of platinum on the graphite about 0.002 inch thick. As shown, the metal providing the metallic surface to which the graphite was joined was either molybdenum or TZM, a molybdenum alloy containing about 0.5 w/o of titanium and about 0.1 w/o of zirconium.

TABLE I

| Test Sample | Temp. (°C.) | Hold Time | Time to Reach Temp. | Time to Cool to 1400° C. | Applied Stress (psi) | MO or TZM | MO or TZM Etched? | Mo or TZM Stress Relieved at 1650° C./½ hr? | Thickness of $Mo_2C$ Layer (.001") | Comment |
|---|---|---|---|---|---|---|---|---|---|---|
| A | 1670 ± 20 | 60 min | * | * | 2000 | Mo | No | No | 4.8 | Cracks in $Mo_2C$ layer, otherwise, good bond. |
| B | 1670 ± 20 | 2 min | * | * | 2000 | Mo | No | No | 0.66 | |
| C | 1550 | * | * | * | 2000 | Mo | No | No | * | Sample not examined. |
| D | 1585 | 3 min | * | * | 2000 | Mo | No | No | 0.48 | |
| E | 1495 | 4 min | * | * | 2000 | Mo | No | No | ~0.06 | |
| F | 1497 ± 7 | 10 min | 12 min | 3½ min | 2000 | Mo | No | No | 0.18 | |
| G | 1545 ± 5 | 2 min 50 sec | 12½ min | 4½ min | 2000 | Mo | No | No | 0.06 | |
| H | 1500 ± 10 | 5 min 10 sec | 14½ min | ~3 min | 2000 | TZM | No | No | | 2" diam. tensile sample pulled to (Values?) failure. |
| I | 1515 | 4 min | * | * | 16.3 | TZM | No | No | | Poor bonding. |
| J | 1515 | 4 min | * | * | 19.6 | TZM | No | No | | Poor bonding. |
| K | 1460 | 4 min | * | * | 19.6 | TZM | No | No | | Poor bonding. |
| L | 1560 | 4 min | * | * | 19.6 | TZM | No | No | | Poor bonding. |
| M | 1460 | 4 min | * | * | 202.9 | TZM | No | No | | Poor bonding. |
| N | 1652 ± 3 | 10 min | 15 min | 4¾ min | 200 | TZM | | | 1.05 | |
| O | 1545 ± 10 | 5 min | 15½ min | ? | 200 | | Yes | | | ¼ of surface of Mo bonded to Pt. |
| P | 1552 ± 3 | 10 min | 13½ min | >1 min | 20 | TZM | Yes | No | 0.6 | Small amount of bonding. |
| Q | 1500 ± 5 | 5 min | 16½ min | 2 min | 20 | TZM | Yes | No | | Poor bonding between TZM and Pt foil. |
| R | 1550 ± 0 | 5 min | 16½ min | 3 min | 200 | TZM | Yes | Yes | 0.12 | |
| S | 1445 ± 20 | 6½ min | 14 min | 1 min | 2000 | TZM | Yes | | 0.03 | Noncontinuous $Mo_2C$ layer. |
| T | 1397 ± 3 | 3½ min | 10 min | 1½ min | 2000 | TZM | Yes | Yes | | Poor bonding between Pt foil and graphite. |
| U | 1432 ± 22 | 1¾ min | 10 min | 1 min | 2000 | TZM | Yes | Yes | | Poor bonding between Pt and C. |
| V | 1502 ± 12 | 4 min | 13 min | 1½ min | 2000 | TZM | Yes | Yes | .04 | .005" Pt foil. |
| W | 1500 ± 15 | 5 min | 11 min | >1 min | 2000 | TZM | Yes | Yes | .04 | .010" Pt foil. |

*Data not recorded.

TABLE II

| Test Sample | Temp. (°C.) | Hold Time | Time to Reach Temp. | Time to Cool to 1400° C. | Applied Stress (psi) | Mo or TZM | Mo or TZM Etched? | Mo or TZM Stress Relieved at 1650° C./½ hr? | Thickness of $Mo_2C$ Layer (.001") | Comment |
|---|---|---|---|---|---|---|---|---|---|---|
| X | 1555 ± 25 | 3 min | 13½ min | 5 min | 200 | TZM | Yes | Yes | | Electroplate surface too rough; |

TABLE II-continued

| Test Sample | Temp. (°C.) | Hold Time | Time to Reach Temp. | Time to Cool to 1400° C. | Applied Stress (psi) | Mo or TZM | Mo or TZM Etched? | Mo or TZM Stress Relieved at 1650° C./ ½ hr? | Thickness of $Mo_2C$ Layer (.001") | Comment |
|---|---|---|---|---|---|---|---|---|---|---|
| | | | | | | | | | | poor bonding between Pt and TZM. |
| Y | 1597 ± 17 | 5 min | 27 min | 3½ min | 20 | TZM | Yes | Yes | 0.60 | Platinum electroplate ground to 600 grit finish. |
| Z | 1505 ± 5 | 5 min | 13 min | 2½ min | 20 | TZM | Yes | Yes | 0.12 | Platinum electroplate ground to 600 grit finish. |
| AA | 1500 ± 5 | 4 min | 12½ min | 2 min | 5 | TZM | Yes | Yes | 0.13 | 8-10 RMS Lap finish. |

Prior to bonding, some of the molybdenum and TZM pieces were stress relief annealed in vacuum at 1650° C. for ½ hour. Also, some molybdenum and TZM pieces were etched by direct immersion for 30 seconds in a solution of 12 gm KOH+12 gm $K_3Fe(CN)_6$ per 100 ml. of $H_2O$ to remove surface oxide scale. Just prior to assembly and diffusion bonding all three components, i.e., the molybdenum (or TZM) body, the platinum foil, and the graphite piece were each ultrasonically cleaned in acetone for several minutes.

Diffusion bonding was performed inside a cylindrically-shaped vacuum chamber measuring 24 inches in diameter by 21 inches in height. Samples were heated by radiation emitted from a graphite susceptor (¾ in. thick×4½ in. high×4 in. inside diameter) which was inductively heated. Assemblies to be diffusion bonded were placed on a graphite block which extended 1½ inches up inside of the graphite susceptor. Assembly temperatures were measured optically. Stresses were applied to the assemblies either by means of a hydraulic ram, which entered through a water-cooled O-ring seal at the top of the vacuum chamber, or by placing molybdenum and/or graphite weights on top of the assembly. In a typical test the desired stress was first applied to the sample, the chamber was then pumped down to a pressure of ~100μ, and 20 kW of power was passed through the copper induction coil. Once the assembly reached the desired temperature, the power was reduced to maintain an approximately constant temperature in the assembly for a given period of time. After the assembly was at temperature for the desired length of hold time, power to the induction coil was shut off. The sample was allowed to cool for 1 hour, at which point its temperature was approximately 300° C. Air was admitted into the chamber, the stress on the assembly was reduced to zero and the unified assembly was removed and permitted to cool to room temperature. To inspect the joint for soundness each sample was then sectioned in half longitudinally and the sectioned surface was metallographically polished and then etched. In addition, the interfaces in selected diffusion-bonded composites were examined in the scanning electron microscope. Various phases were identified by energy dispersive X-ray analysis. Finally, the variation of molybdenum and platinum across the molybdenum-platinum-carbon interfaces was measured by electron microprobe analysis of two composites.

Reporting on particular test samples, sample A which was diffusion bonded at 1670° C.±20° for 60 minutes under an applied stress of 2000 psi exhibited a thick (approximately 0.005" thick) $Mo^2C$ layer at the molybdenum-platinum interface. This layer was identified as $Mo_2C$ by electron beam microprobe measurements, which indicated it to be free of platinum and to contain 94 w/o molybdenum. The $Mo_2C$ layer contained a number of sharp cracks. However, the cracking was not nearly as severe as that which can occur during brazing, because of the higher temperatures employed in brazing. The sample which was diffusion bonded at 1670° C. ±20° for 2 minutes at an applied stress of 2000 psi exhibited a $Mo_2C$ layer which was ~0.0007" thick. This layer had a few, small, isolated cracks. All other samples were completely free of cracks.

The results obtained for samples T and U indicate that the bonding produced at a temperature of 1400° C. for 3½ minutes or 1430° C. for 1¾ minutes was insufficient to provide a sound joint. Test results for samples S, V and W indicate that a minimum temperature of ~1450° C. is required to produce a sound diffusion-bonded graphite-metallic surface joint. Even at this relatively low temperature, however, a thin (~0.00003" thick), albeit noncontinuous, layer of $Mo_2C$ is formed. Thus, diffusion bonding at temperatures ranging from 1450° C. to 1550° C. for periods of about 4 to about 5 minutes at an applied stress of 2000 psi will produce a crack-free interface with only a thin layer (i.e., less than 0.0002" thick) of $Mo_2C$.

The ability of the platinum layer to act as a diffusion barrier to carbon at X-ray tube operating temperatures was demonstrated by the lack of growth of the 0.001" thick $Mo_2C$ layer of sample N during 25 hours at 1300° C.

To determine if crack-free joints could be formed by diffusion bonding at stresses lower than 2000 psi, tests were performed at applied stresses of ~200 psi and ~20 psi. The results of these experiments are found in specimens I-N. Only specimen N, which was diffusion bonded at ~1650° C. and 200 psi for 10 minutes, produced a sound joint. All others which were joined at temperatures of 1460° C.-1560° C., exhibited poor bonding between the platinum foil and the graphite. Optical microscopic examination of these samples suggested that the poor bonding was due to insufficient contact between the platinum foil and the porous graphite during diffusion bonding. The low stresses were insufficient to deform the platinum foil so that it was brought into intimate contact with the graphite.

In order to bring the platinum layer into intimate contact with the graphite without the use of high stresses (~2000 psi), a 0.002" thickness of platinum was electroplated onto the graphite body. Best results were obtained by first thermally shocking the graphite body by heating it to ~500° C. and then rapidly quenching it in water. This treatment opened up some surface pores on the graphite body and cleaned the graphite body by removing small, dust-like pieces of graphite from its surface. The platinum electroplating bath possessed good throwing power and the microscopically irregular and porous graphite surface was covered with substantially pure platinum metal. A 0.002" thick foil of platinum was then placed on top of the electroplated platinum and the TZM piece was, in turn, placed on top of the platinum foil. These assemblies, samples O-R, were then diffusion bonded at temperatures ranging from 1500° to 1550° C. with applied stresses of ~20 to ~200 psi. The results indicate that an applied stress of 20 psi either at 1500° C. for 5 minutes or at 1550° C. for 10 minutes was insufficient to produce a sound joint. An applied stress of 200 psi at 1550° C. for 5 minutes appeared to be just barely sufficient to produce bonding. In all (O-R) cases, with the exception of sample Q, there was excellent bonding between the graphite and the electroplated platinum layer and between platinum foil and the TZM. The regions of poor bonding were located between the platinum foil and the platinum electroplate. This behavior appeared to be due to the rough surface of the electroplated platinum so that the applied stresses of 20 psi and 200 psi were too low to deform the platinum foil sufficiently to bring it into intimate contact with the electroplated platinum. In sample Q, there also was poor bonding between the platinum foil and the TZM. Metallographic examination of this sample suggested that a bond had been formed between the platinum and the TZM but that residual stresses induced in the latter during grinding broke the joint apart. Heavy grinding operations on TZM and molybdenum samples used in subsequent experiments were followed by a stress relief anneal at 1650° C. for ½ hour to eliminate this problem.

In the case of the test samples of Table II, in each case the graphite member was electroplated with 0.002" of platinum and this surface was directly bonded to the TZM. An intermediate layer of the platinum foil was not used. A poor bond was formed between the TZM surface and the electroplated platinum surface in sample X. The electroplated platinum surface was too rough to be brought into intimate contact with the TZM surface by applying a stress as low as 200 psi. To improve the degree of contact between the TZM and the electroplated platinum layer, in the case of sample Z the platinum layer was ground to a 600 grit finish using silicon carbide polishing paper. Good bonding was achieved between the TZM and the electroplated platinum at a temperature of 1505° C. maintained for 5 minutes using an applied stress of only 20 psi. Finally, the TZM and electroplated platinum surfaces used in sample AA were lap-finished to produce a surface roughness of 8-10 root mean square (RMS). The composite from this sample exhibited good bonding at all interfaces in spite of being formed at a temperature of 1500° C. held for 4 minutes with an applied stress of only 5 psi.

In summary, the tabulated results indicate that molybdenum and TZM can be diffusion bonded to graphite using an intermediate layer of platinum to produce a sound composite structure in which a crack-free layer of $Mo_2C$ of predetermined maximum thickness is formed, but the formation of additional $Mo^2C$ during operation at 1300° C. is prevented. The $Mo_2C$ is brittle and appears to be highly susceptible to cracking when present as a layer thicker than $\sim 0.7 \times 10^{-3}$ in. If bonding temperatures in the range of 1450° C.-1550° C. for 5 minutes are used the thickness of $Mo_2C$ will be kept to less than $\sim 0.2 \times 10^{-3}$ in. The applied stress required for a good bond depends on the surface finishes of mating parts. The lower the stress used, the smoother the mating surfaces must be. At an applied stress of 2000 psi, sound joints can be produced without any need for special surface preparation. With an 8-10 RMS finish on the platinum and TZM surfaces, good bonding can be achieved with an applied stress of only 5 psi. Porosity of the graphite results in its rough surface. In order to insure bonding over the entire graphite surface contiguous with the platinum layer, a high stress (~2000 psi) should be applied when a 0.002" thick platinum foil is used. If a low stress is to be used, the platinum layer should be electroplated onto the graphite in order to fill the graphite pores. It is also expected that an alternative method of platinum deposition, e.g., vacuum sputtering, can be used.

When graphite is to be diffusion bonded to tungsten or tungsten alloys, the temperature/time/applied stress relationships are equally applicable to produce a sound joint containing a tungsten carbide layer of controlled maximum thickness of less than about 0.0002 inch.

In claiming this invention reference to a layer of platinum or platinum alloy shall be understood to encompass either a single layer or contiguous multiple layers thereof, because the function remains the same for the multiple layers as for the single layer.

What is claimed is:

1. The procesa for joining mating surfaces of a graphite member and a metal component as elements by diffusion bonding during preparation of an anode assembly for a rotary X-ray anode; the metal of said metal component being selected from the group consisting of tungsten, tungsten alloys, molybdenum and molybdenum alloys, said process comprising the steps of:

(a) assembling said graphite member, said metal component as elements and disposing at least one continuous layer of metal selected from the group consisting of platinum and platinum alloys therebetween, disposing said assembly in a chamber with said mating surfaces in nesting juxtaposition and said layer contiguous with both said mating surfaces, (b) applying a compressive stress to the assembled elements sufficient to urge each of said elements into intimate contact with any adjacent element so as to enable the diffusion of atoms to occur therebetween, (c) providing an atmosphere in said chamber inert to said assembled elements, (d) heating said assembled elements while under stress to a temperature in the range of from about 1450° C. to about 1550° C., (e) holding said assembled elements under stress at said temperature for a period of from about 4 to about 5 minutes during which time a crack-free layer of carbide of metal of said metal component forms, said carbide layer having a thickness of less than about 0.0002 inch and said assembled element are unified, (f) ceasing the heating to permit the unified assembled elements to cool and (g) recovering said unified assembled elements.

2. The process of claim 1 wherein the applied stress is in the range of about 5 to about 2000 psi.

3. The process of claim 1 wherein the at least one layer is a platinum foil about 0.002 inch in thickness.

4. The process of claim 1 wherein the graphite member is subjected to thermal shock prior to assembly.

5. The process of claim 4 wherein a layer of platinum is deposited by electrodeposition on the mating surface of the graphite member.

6. The process of claim 5 wherein the outer surface of the layer of platinum is subjected to mechanical abrasion to render it more smooth.

7. The process of claim 6 wherein the surface is ground to a 600 grit finish.

8. The process of claim 1 wherein a layer of platinum is deposited by electrodeposition on the mating surface of the graphite member.

9. The process of claim 8 wherein the contiguous surfaces of the layer of platinum and the mating surface of the metal component are provided with a surface roughness of 8–10 RMS.

10. The process of claim 8 wherein in addition to the electrodeposited layer of platinum, a foil of platinum is placed contiguous to said electrodeposited layer.

11. The process of claim 1 wherein the metal component is etched prior to assembly to remove oxide scale from its mating surface.

12. The process of claim 1 wherein the elements to be assembled are ultra-sonically cleaned in an organic solvent.

13. The process of claim 1 wherein the heating is omplished by radiant heating.

14. The process of claim 1 wherein the inert atmosphere is created by evacuation of the chamber.

15. The process of claim 1 wherein the inert atmosphere is an argon environment.

16. The process of claim 1 wherein the inert atmosphere is a hydrogen environment.

17. The process of claim 1 wherein the at least one layer of platinum or platinum alloy is deposited by vapor deposition.

* * * * *